(12) United States Patent
Duvall et al.

(10) Patent No.: US 6,668,455 B2
(45) Date of Patent: Dec. 30, 2003

(54) METHOD FOR PREPARING A MULTI-LAYER METAL TUBE

(75) Inventors: Joseph A. Duvall, Millington, MI (US); Kevin E. Nicholls, London (CA)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/927,158

(22) Filed: Aug. 10, 2001

(65) Prior Publication Data

US 2002/0029454 A1 Mar. 14, 2002

(Under 37 CFR 1.47)

Related U.S. Application Data

(60) Provisional application No. 60/224,862, filed on Aug. 11, 2000.

(51) Int. Cl.⁷ ................................................ B21D 51/16
(52) U.S. Cl. ................................ 29/890.191; 29/426.3; 29/426.6; 29/426.4; 29/890.14; 156/584; 156/344
(58) Field of Search .......................... 29/426.1, 426.3, 29/426.4, 426.5, 426.6, 402.06, 890.14, 564.4, 564.3, 890.141; 81/9.51, 9.4, 9.41, 9.42, 9.43, 9.44; 156/584, 344, 247, 254

(56) References Cited

U.S. PATENT DOCUMENTS

| 3,195,377 A | | 7/1965 | Frank | |
|---|---|---|---|---|
| 3,462,052 A | * | 8/1969 | Wagner | 225/2 |
| 3,495,484 A | | 2/1970 | Bunnell | |
| 3,577,813 A | | 5/1971 | Vorontsov | |
| 4,308,896 A | * | 1/1982 | Davis | 138/126 |
| 4,322,262 A | * | 3/1982 | Cottam | 156/392 |
| 4,549,923 A | * | 10/1985 | Tachibana et al. | 156/423 |
| 5,076,329 A | * | 12/1991 | Brunnhofer | 138/137 |
| 5,711,549 A | * | 1/1998 | Beans | 285/93 |
| 5,809,652 A | * | 9/1998 | Ducret | 30/90.7 |
| 5,991,995 A | * | 11/1999 | Gabbey | 29/426.4 |
| 6,071,579 A | * | 6/2000 | Green et al. | 428/36.3 |
| 6,463,654 B1 | * | 10/2002 | Moore | 29/825 |
| 6,531,019 B2 | * | 3/2003 | Usui | 156/247 |

FOREIGN PATENT DOCUMENTS

| DE | 25 40 933 | 9/1975 |
|---|---|---|
| DE | 299 03 687 | 3/1999 |
| EP | 10118863 | 12/1998 |
| WO | WO 98/39137 | 9/1998 |

* cited by examiner

Primary Examiner—Gregory Vidovich
Assistant Examiner—Marc Jimenez
(74) Attorney, Agent, or Firm—Young & Basile, P.C.

(57) ABSTRACT

A method for preparing a multi-layer metal tube, comprises the steps of breaking the adhesion between at least a portion of a polymeric layer and an outer surface circumference of a metal tube having a corrosion resistant layer applied thereto, thereby causing the polymeric layer portion to retract and loosely adhere to a non-retracted polymeric layer adjacent the polymeric layer portion; and mechanically removing the retracted portion of the polymetric layer while leaving the corrosion resistant layer intact. An apparatus for achieving the mechanical removal is also disclosed.

24 Claims, 4 Drawing Sheets

METHOD FOR PREPARING A MULTI-LAYER METAL TUBE

CROSS-REFERENCE TO RELATED APPLICATIONS

This application claims the benefit of U.S. Provisional application Ser. No. 60/224,862, filed on Aug. 11, 2000.

FIELD OF THE INVENTION

BACKGROUND OF THE INVENTION

This invention relates to mechanical removal of a plastic layer bonded to a metal tube, and more particularly to such removal of the plastic layer without damage to the corrosion resistant layer bonded to the metal tube and/or to the bare metal tube outer surface.

In the automotive industry, it is typical to create what are called "ISO" or "SAE" flared endforms on high pressure fluid conduits, particularly brake tubes. Automotive manufacturers mandate that the front and back flare faces be free from substantial polymeric layers. The manufacturers are concerned over a potential loss of assembly torque over the long term of a vehicle's life which could occur if the relatively soft polymeric material, eg. nylon, should extrude out of the sealing area and fitting compression area after assembly.

The polymeric material is present on the outer surfaces of the fluid conduits in order to greatly enhance the corrosion resistance of the metal tubing comprising the conduits. Thus, manufacturers of these conduits, especially when end use will be under a vehicle body, do not want to remove any more of this corrosion resistance-enhancing polymeric material than is necessary, eg. for example, not substantially past a flare into the straight section of the tube. Further, the metal tubing generally has a corrosion resistant layer bonded to the metal tube outer surface. As such, it is highly desirable that any removal process not damage the corrosion resistant layer beneath the polymer, nor the outer surface of a bare metal tube (if no corrosion resistant layer has been bonded thereto).

Several methods have been tried, with varying levels of success. However, each method has serious drawbacks, substantially preventing the use thereof. A rotary lathe cut method uses a chuck holder with lathe style square tool bits. It is mounted on a standard rotary head deburring unit. The method is simple and reliable; however, results revealed that the nylon does not easily machine off. Strings/burrs are left on, particularly at the transition line. Further, infinite adjustments and measurements would have to be made due to the tube O.D. variation and eccentricity, to attempt to prevent cutting through the tube substrate.

A method using rotary brushes employs the use of a grinding wheel head driving a brush. The tube was held and rotated by hand. The area where the coating is to be removed is forced into the brush, and the transition line is determined by locating a protective sleeve over the tube at the desired location. The sleeve used is about 2" long and held in place with a set screw. Unfortunately, this method requires a complex adjustment mechanism to compensate for brush wear. Further, it is very difficult to determine if only the nylon would be removed. Other brushes have been tried with no real success.

A square head die method uses a blunt nose die that has a fixed diameter hole that goes over the steel tube and pushes the nylon to a desired distance. The "pushed back" nylon material is then cut off and removed via a rotary lathe cut system. This method has some drawbacks, including but not limited to that it would be extremely difficult, if not impossible, to predict the amount (thickness) of nylon removed or conversely, left on, and the rotary lathe would dig into any corrosion resistant coating.

A water jet knife method involves the use of a high pressure water jet system to cut and blow off a nylon coating without affecting a ZnAl substrate. The method involves rotating the tube at high rpm while a stationary high pressure water jet removes the coating. The travel speed of the jet was 12"/minute (=0.2"/sec.). The entire system uses 50 Hp of power (=37.3 KW). This method does appear to remove the nylon coating without affecting the corrosion resistant coating, it is forgiving to the O.D. and ovality variances and has a very fast cycle time. However, it is difficult and costly to have high rpm tube rotation; the system uses ultra clean water as the removal medium (which is expensive), and it is not economical to recycle the water. The water will be a problem to the exposed ends of the tube. A further drawback is that there are high maintenance costs for the system.

Thus, it would be desirable to provide a method for the fast, efficient, precise and cost effective removal of one or multiple polymeric layers from a metal substrate. Further, it would be desirable to provide such a method which will not damage the substrate or any corrosion resistant coating thereon. It would still further be desirable to provide such a method which is forgiving to outer diameter and ovality variances.

SUMMARY OF THE INVENTION

The present invention addresses and solves the above-mentioned problems by providing a method for preparing a multi-layer metal tube, comprising the steps of: breaking the adhesion between at least a portion of a polymeric layer and an outer surface circumference of a metal tube having an optional corrosion resistant layer applied thereto, thereby causing the polymeric layer portion to retract and loosely adhere to a non-retracted polymeric layer adjacent the polymeric layer portion; and mechanically removing the retracted portion of the polymeric layer while leaving the corrosion resistant layer intact.

Other applications of the present invention will become apparent to those skilled in the art when the following description of the best mode contemplated for practicing the invention is read in conjunction with the accompanying drawings.

BRIEF DESCRIPTION OF THE DRAWINGS

Other objects, features, advantages and applications of the present invention will become apparent by reference to the following detailed description and to the drawings, in which.

DETAILED DESCRIPTION OF THE PREFERRED EMBODIMENT

Figure 1:
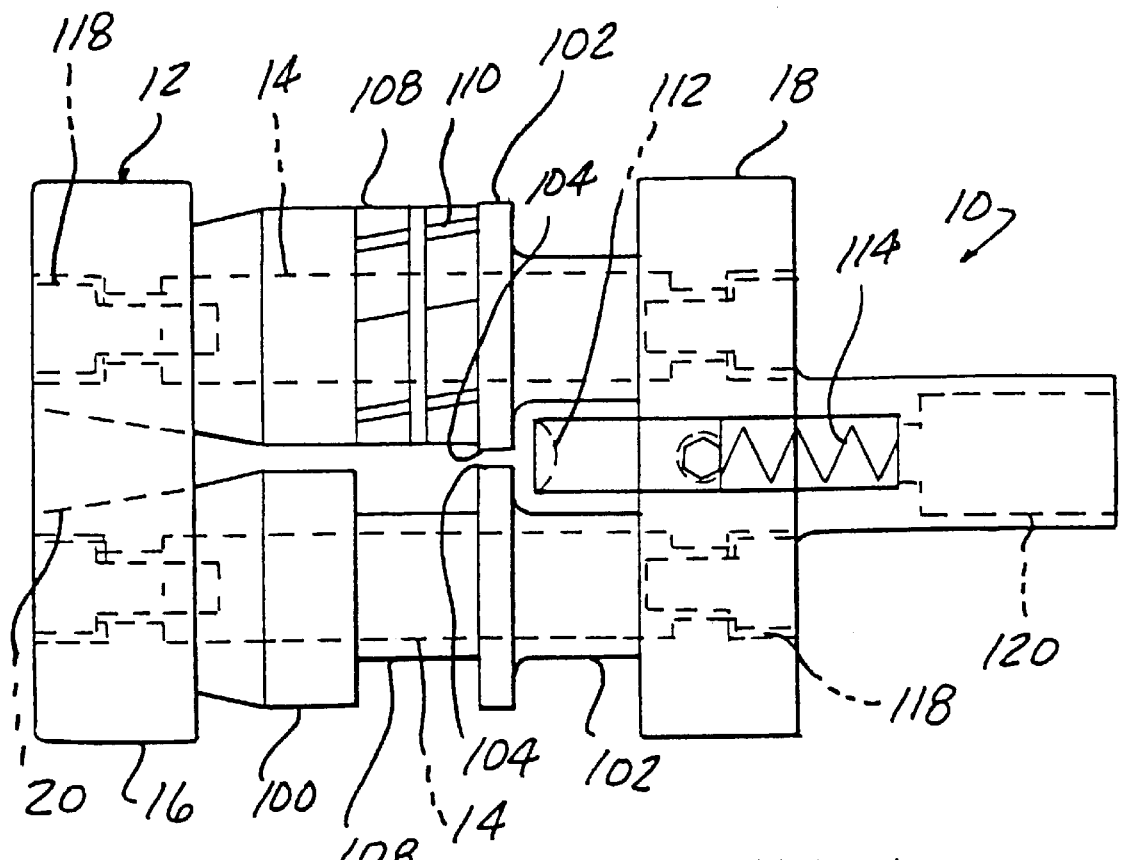
FIG. 1 is a semi-schematic side view of the mechanical removal apparatus of the present invention.
Figure 5:
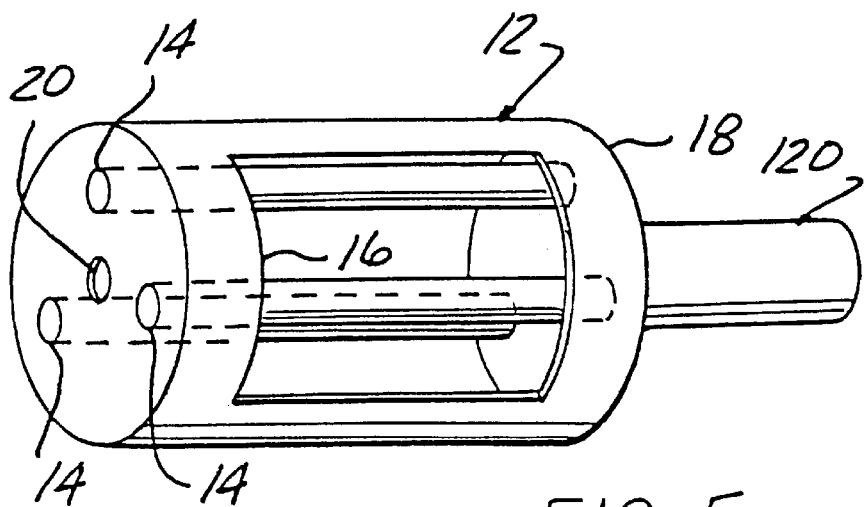
FIG. 5 is a semi-schematic perspective view of the carrier head housing, showing the spindles and the tube entry aperture.

Referring now to FIG. 1, the mechanical system of the present invention for removing a plastic layer from the outer surface of a metal tube is designated generally as 10. The removing system comprises a carrier head housing 12, as best seen in FIG. 5. It is to be understood that housing 12 is merely exemplary of many housings 12 which would be suitable in the present invention for encapsulating the elements (as described hereinbelow) of the inventive device. Carrier head housing 12 is rotated around the tubing at a high rate of speed.

Carrier head housing 12 includes two carrier plates 16, 18 mounted at opposed ends of the housing 12. Carrier plate 16 has defined therein a tube entry throughbore 20. Retained within the carrier head housing 12 are three spindles 14. It is to be understood that the spindles 14 may be retained by any conventional fastening means, including but not limited to bolts 118, shouldered bolts, snap rings, welding, adhesive, and the like. Further, it is preferred that spindles 14 are hardened shafts to facilitate rotation.

Figure 2:
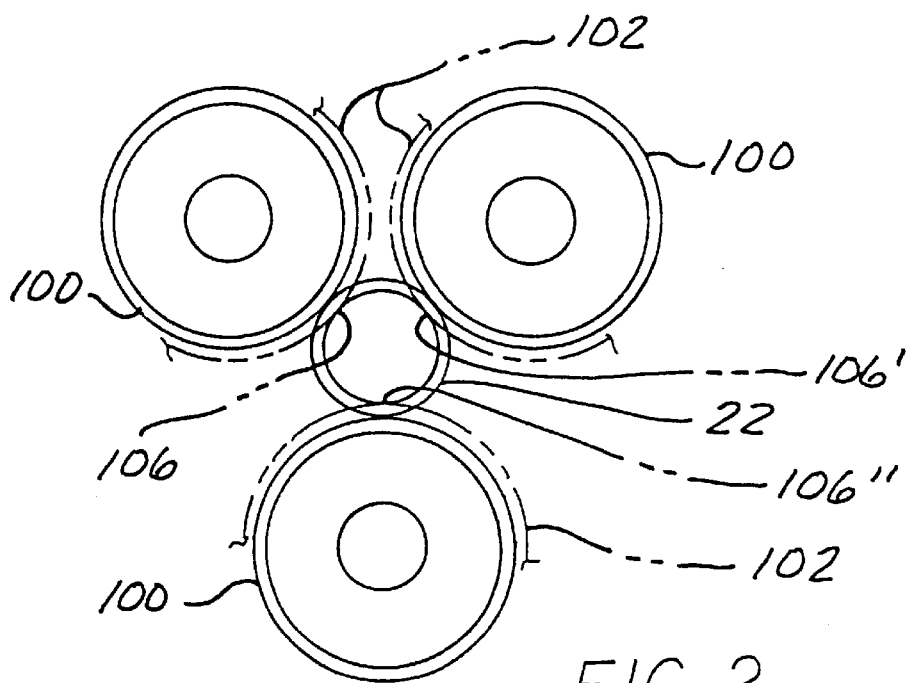
FIG. 2 is an end view of the guide rolls, showing a metal tube therein having a plastic coating thereon, and also showing a portion of the stripper rolls in phantom at the contact points between the stripper rolls and the coated tube.

Disposed on the spindles 14 adjacent carrier plate 16 are guide/swedge rolls 100. Guide rolls 100 are contacted by the tube 22 first, and serve to confine, guide, and orient the plastic-covered tube 22. The guide roll 100 arrangement provides for three distinct pressure points, each exerting a force on the tube 22 (as best seen in FIG. 2). Without being bound to any theory, it is believed that these pressure points act as a rotation normalizer, allowing the metal tube 22 to center itself inside the plastic coating, thereby obviating the necessity for perfectly round tube 22. The guide roll 100 is calibrated to the metal tube minimum and coating thickness 88.

Stripping/deburring device 10 further comprises three stripper (burnish) rolls 102. After passing the guide rolls 100, the plastic coated tube 22 is then pressed against and through the set of three stripper rolls 102. Each stripper roll 102 has a cutting edge 104. It is to be understood that cutting edge 104 may comprise any suitable size, shape and/or configuration. See, for example, the alternate embodiment 104' of the cutting edge on stripper roll 102' in FIG. 3. In the preferred embodiment, as shown in FIG. 1, cutting edge 104 comprises substantially 90° corners. It is to be understood that some variation away from 90° is acceptable in this embodiment, as long as the cutting edge 104 functions properly as described herein.

The distance from the stripper roll 102 to the point of contact on the tube 22 is calculated by swedging the polymeric layer 88 to a minimum, stripping the coating 88 by heat, and then measuring. The stripper roll 102 spacing allows for a tube receiving opening that is marginally larger than the steel tube substrate, but smaller than the outside diameter of the coated tube 22. The tube receiving opening is defined substantially by the three contact points between the stripper rolls 102 and the tube 22, shown in FIG. 2 at 106, 106' and 106".

Figure 7:
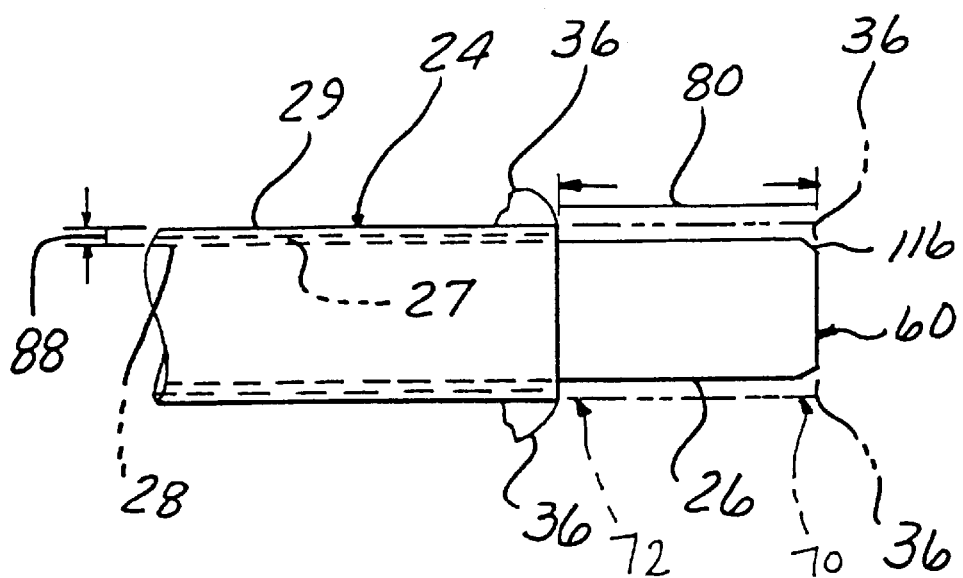
FIG. 7 is an enlarged, partially cut away view of the multi-layer tube showing the polymeric layer portion removed.

Cutting edge 104 breaks the adhesion of at least a portion 36 of a polymeric layer, designated generally as 24, from the outer surface circumference 26 of a metal tube 28 having an optional corrosion resistant coating layer 30 applied thereto. In the preferred embodiment, the metal tube 28 may be substantially non-rotating, although it is to be understood that the metal tube 28 may also rotate. The polymeric layer 24, eg. one or more layers of nylon, is forced back by cutting edge 104. Then, due to the affinity of polymers to adhere to chemically similar polymers, portion 36 loosely adheres to the portion of the polymeric layer 24 adjacent the pushed back portion 36, as seen in FIG. 7.

It is to be understood that the polymeric layer portion 36 may be removed from any area of the tube 22; however, in the preferred embodiment, the polymeric layer portion 36 is removed from a tube end, eg. end 60, and portion 36 has a first area 70 adjacent the tube end 60 and a second area 72 distal from the tube end 60. When the cutting edge contacts the polymeric layer portion first area 70, the first area 70 moves toward the second area 72 as the tube 22 moves relative to the stripper roll cutting edge 104.

Figure 3:
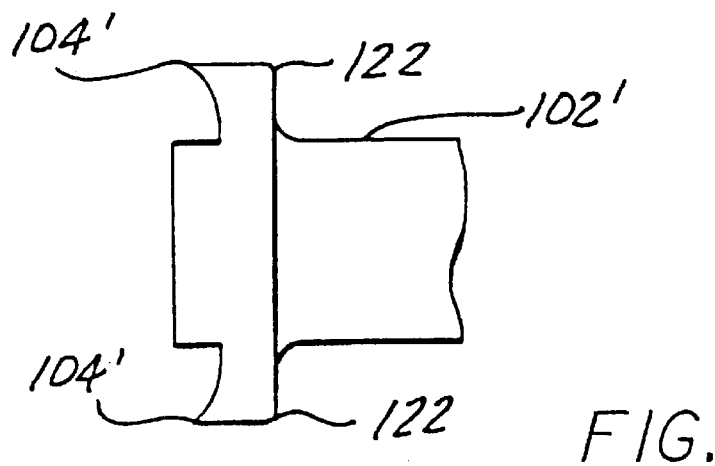
FIG. 3 is a cut away, side view of an alternate embodiment of a stripper roll.

In either of the embodiments of stripper roll 102, 102', the edge 122 (as seen in FIG. 3) opposed to cutting edge 104 may optionally be rounded in order to avoid marring any surface treatment 30 on the metal substrate tube 28.

Figure 4:
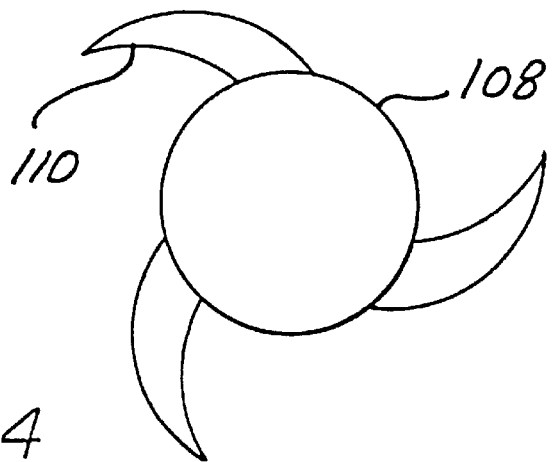
FIG. 4 is an end view of an embodiment of a removal roll.

Stripping/deburring device 10 further comprises three removal rolls 108. It is to be understood that removal rolls 108 may be of any suitable size, shape and/or configuration. For example, removal rolls 108 may simply comprise a sharpened blade. However, in the preferred embodiment, removal rolls 108 comprise a wheel, having helically cut sharpened blades 110, as shown in FIGS. 1 and 4. The helically cut blades 110 aid in guiding the removed polymeric layer portion 36 away from the tube 22, and out of the carrier head housing 12.

Stripping/deburring device 10 may further comprise a radially cut, serrated carbide insert 112 that travels on a spring 114. This insert 112 deburrs the end 60 of the tube, as well as adds a small chamfer 116. Insert 112 may be axially slidingly retained, but is rotationally constrained with respect to carrier plate 18 by set screw 124.

At this point, the carrier head housing 12 retracts from the tube 22, and a quick air blast cleans out any residual polymeric material 36.

Device 10 further comprises a drive coupling 120, operatively connecting housing 12 to a drive means (not shown). It is to be understood that drive coupling 120 may comprise any suitable conventional coupling, including but not limited to a splined coupling, a threaded coupling, and the like. Similarly, the drive means may comprise any suitable conventional drive means.

It is to be understood that the three sets of rolls 100, 102, 108, may or may not rotate independently of each other. Further, although each set of rolls 100, 102, 108 has been disclosed as comprising three rolls, it is to be understood that the present inventive device 10 may function suitably with two or even one roll (with suitable balancing and calibration) at each of the guide 100, stripping 102 and removal 108 areas of the device 10.

Figure 6:
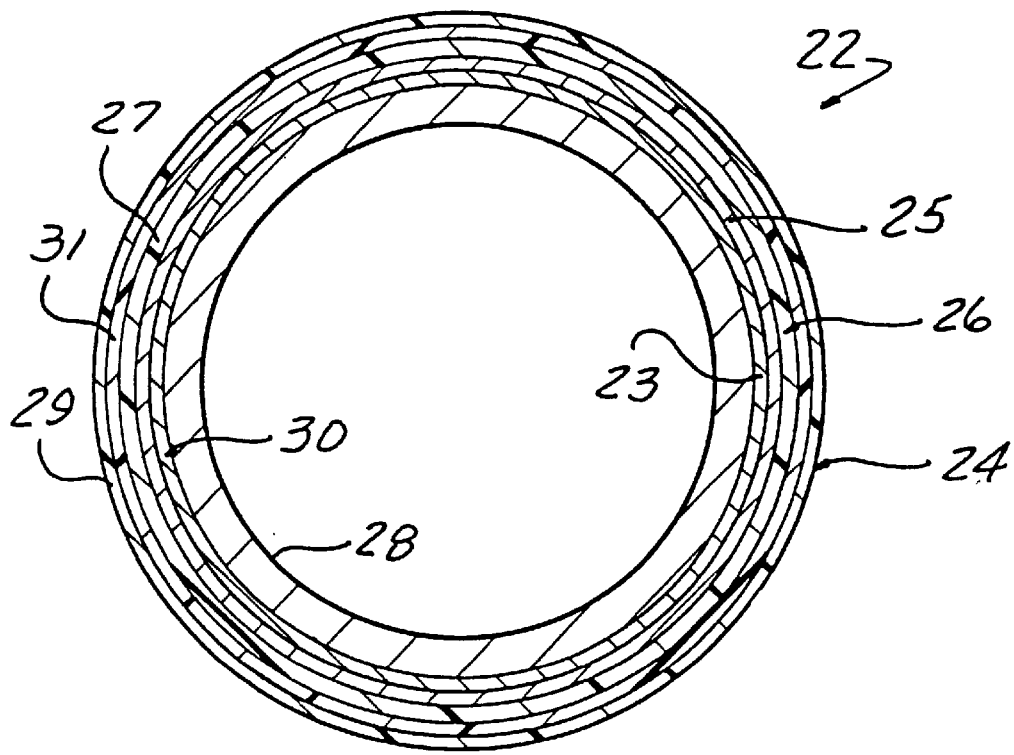
FIG. 6 is an enlarged, cross sectional view of a multi-layer tube, with the layer thicknesses exaggerated for a purposes of illustration.

Referring now to FIGS. 6 and 7, the method for preparing a multi-layer tube 22 according to the present invention comprises the step of substantially removing at least a portion 36 of a polymeric layer, designated generally as 24, from an outer surface circumference 26 of a substantially non-rotating metal tube 28 having a corrosion resistant coating layer 30 applied thereto, while leaving the corrosion resistant layer 30 (or simply the metal tubing substrate, if no corrosion resistant layer 30 is applied) intact.

In FIG. 7, there is shown a metal tube 28 having a first polymeric layer 27 bonded thereto, and a second polymeric layer 29 bonded to first layer 27. The polymeric layer portion 36 removed also has a length 80 which may vary substantially; however, in the preferred embodiment, this length 80 ranges between about 1 mm (0.04") and about 76.2 mm (3"); preferably length 80 ranges between about 4 mm (0.157") and about 8 mm (0.315"); and more preferably, length 80 ranges between about 6 mm (0.236") and about 7 mm (0.276").

The polymeric layer 24 may comprise one or multiple individual polymeric layers, having a varying thickness 88. However, in the preferred embodiment, this thickness 88 ranges between about 170 microns (0.0068") and about 202 microns (0.0081").

Due to the rotation of the housing 12 and the structure of device 10 as described herein, the polymeric layer portion removal 36 may be accomplished quickly, without rotating the tube 22, and in a single pass. The cycle time for removal has a time ranging approximately, for tubes having diameters of ³⁄₁₆", ¼", ⁵⁄₁₆" and/or ⅜", between about 2 secs. and about 4 secs. In the preferred embodiment, the polymeric layer portion 36 removal is accomplished in approximately 3 secs. This time interval is dependent upon the OD of the tube 22. As the OD becomes greater, the forward motion of the tube should be slowed down. For example, the end portion removal of a ³⁄₁₆" tube is about 2–3 seconds.

Figure 8:
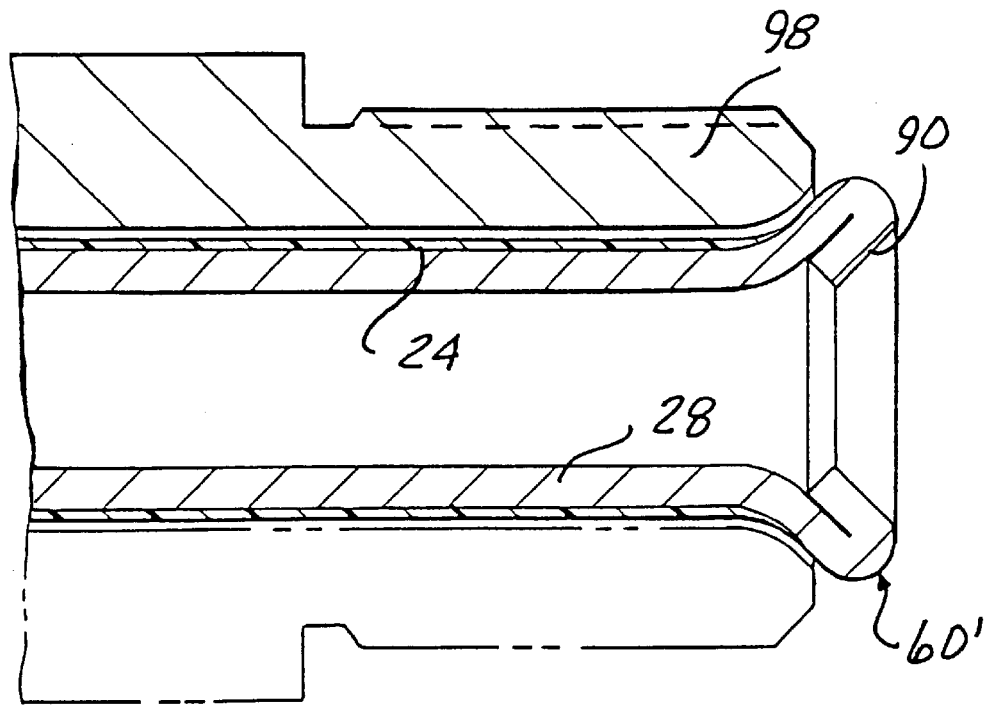
FIG. 8 is an enlarged, cut away cross sectional view of an SAE-type double or inverted flare, showing the lower half of the endform in phantom and showing the mechanically removed surface on the flare.
Figure 9:
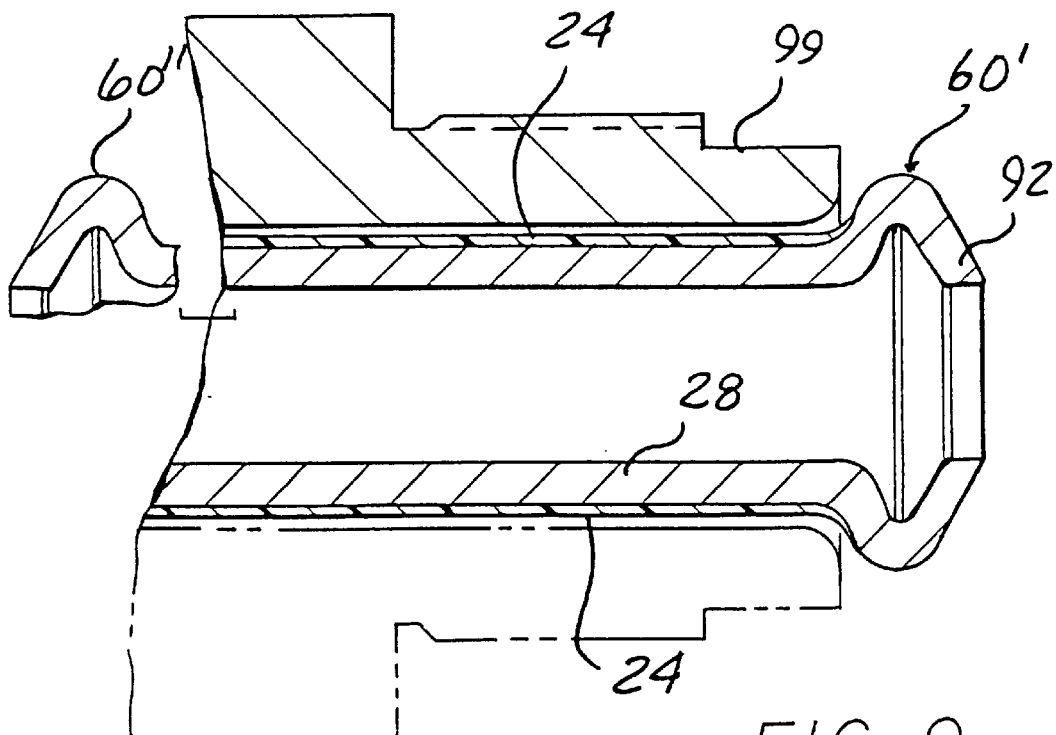
FIG. 9 is an enlarged, cut away cross sectional view of an ISO-type annularly protruding flare, showing the lower half of the endform in phantom and showing the mechanically removed surface on the flare.

The method of the present invention has particular use for high pressure fluid conduits having two ends 60', 60", with the polymeric layer portion 36 removed from each end 60', 60". The method may further comprise the step of endforming each of the conduit two ends 60', 60" into either an SAE-type double or inverted flare 90, as shown in FIG. 8 in an appropriate tube nut 98; or an ISO-type annularly protruding flare 92, as shown in FIG. 9 in an appropriate tube nut 99. Such endforming has particular use to prepare multi-layer tubing for brakeline connectors. Examples of suitable endforming apparatus may be found in U.S. Pat. Nos. 5,529,349 and 5,489,127. It is to be understood that the above description of SAE and ISO endforms are exemplary, and that the method of the present invention may be applicable to prepare tubing 22 for many other forming and/or endforming operations.

As shown, each of the flares 90, 92 is formed approximately where the polymeric layer portion 36 is removed. The center of radius on the SAE endform is designated 89; and the center of radius on the ISO endform is designated 93. In the preferred embodiment, the polymeric layer 24 is removed to within this range. For a ³⁄₁₆" tube size, the length of the centers 89, 93 of radius is approximately 0.8 mm.

The metal multi-layer tube 22 may be particularly advantageous as at least one of a brakeline, a vacuum line, a transmission oil cooler line, a vapor return line, or a fuel line. In addition to any other applications discussed further hereinbelow, tube 22 may also have application in other areas.

The method of the present invention may remove one or more polymeric layers from a multi-layer tube 22. It is to be understood that corrosion resistant layer 30 on metal tube 28 of multi-layer tube 22 is optional. Further, if multi-layer tube 22 does have a corrosion resistant layer 30, there may or may not be a surface treatment layer 25 bonded thereto; ie. the surface treatment layer 25 is also optional.

Tube 22 may be hand-fed into device/system 10; however, it is to be understood that device 10 of the present invention may easily be adaptable to a more complex progressive/transfer machine, where system 10 may become one of many stations. The present system 10 strips one end 60, and can be adapted for two ends.

It is to be further understood that any or all of the variations regarding the corrosion resistant coatings, surface treatment layers, and one or multiple polymeric layers, as well as methods for applying the same onto the metal tube 28, as described in U.S. Pat. No. 5,590,691 (referenced hereinbelow), may be suitable in the system 10 of the present invention for removing a plastic layer 24 from the outer surface 26 of a metal tube 28.

Corrosion of metal tubing can be minimized by various methods, for example, by the use of a coating of protective metal such as zinc, tin, lead, nickel or copper; by the production of oxide, phosphate or similar coatings on iron and steel surfaces; by the application of protective paints; and by rendering the surface of the metal passive. Galvanizing zinc is applied to metal surfaces by dipping into a bath of molten zinc, by electrodeposition, or by metal spraying. Preferred methods/materials for providing corrosion resistance to a metal tube are described in U.S. Pat. No. 5,590,691, which is incorporated herein by reference in its entirety.

Referring again to FIG. 6, the multi-layer tube of the present invention is designated generally as 22. Multi-layer tube 22 comprises a tube or pipe 28 having an outer surface 26. Tube 28 may be formed in any conventional manner and of any suitable material. For example, tube 28 may be a welded single wall steel tube, a brazed double wall steel tube, etc. Further, aluminum, stainless steel and the like also may be used. Yet still further, tube 28 may be formed from any rigid or semi-rigid tubular material. Tube 28 may be of circular cross section as shown, however, it is to be understood that tube 28 may be formed of any suitable size and/or shape, including square, rectangular and other geometric configurations.

A suitable corrosion resistant layer 30 may be bonded to metal tube outer surface 26. In the preferred embodiment, corrosion resistant layer 30 comprises a zinc layer 23 bonded to the metal tube outer surface 26. It is to be understood that any suitable zinc layer 23 may be used in accord with the present invention. However, in the preferred embodiment, the zinc layer is selected from the group consisting of zinc plating, zinc nickel alloys, zinc cobalt alloys, zinc aluminum alloys, and mixtures thereof.

A surface treatment layer 25 is bonded to the zinc layer 23. Any suitable surface treatment layer 25 may be used. However, in the preferred embodiment, surface treatment layer 25 is selected from the group consisting of a zinc/aluminum/rare earth alloy, phosphate, chromate, and mixtures thereof.

The phosphate and/or chromate may be applied in any suitable manner. In the preferred embodiment, a hot phosphoric acid is used. Without being bound to any theory, it is believed that this acid etches into the metal surface, leaving a phosphate crystalline structure in the metal, which structure aids in subsequent adhesion of polymeric materials. Over electroplating, a wet bath chromate may be used, after which the metal is rinsed well. Chromium oxides are left on the metal, which are believed to aid in corrosion resistance, and which, although optional, are further believed to enhance the advantageous properties of the phosphate. Over the zinc/aluminum/rare earth alloy treatment, a dry chromate may be used which does not require subsequent rinsing.

The zinc/aluminum/rare earth alloy used is preferably GALFAN, commercially available from Eastern Alloys, Inc. in Maybrook, N.Y.; licensed from the International Lead Zinc Research Organization, Inc. located in New York, N.Y.; and described in U.S. Pat. No. 4,448,748, discussed more fully above. Particularly preferred is the combination of the GALFAN with the phosphate, or the GALFAN with the phosphate and chromate. Without being bound to any theory, it is believed that either of these two combinations for the surface treatment layer 25 are particularly advantageous and useful in the present invention.

It is to be understood that the zinc layer 23 and/or surface treatment layer 25 may be optional components of the present invention. Various polymeric compositions may be applied directly to a bare metal surface, especially for decorative purposes. Further, it is contemplated that various polymeric compounds and/or blends, including those containing suitable ionomers, may substantially bond to an untreated metal surface, thereby giving the numerous corrosion and abrasion resistant properties enumerated herein.

A first polymeric layer 27 is bonded to the surface treatment layer 25. It is to be understood that any suitable polymeric layer may be used which suitably bonds to the surface treatment layer 25, and in turn, suitably bonds to subsequent polymeric layers, if any. In the preferred embodiment, the first polymeric layer 27 is selected from the group consisting of thermoplastic elastomers, ionomers, nylons, fluoropolymers, and mixtures thereof.

A second polymeric layer 29 may be bonded to the first polymeric layer 27, as shown in FIG. 7. It is to be understood that any suitable polymeric layer may be used which suitably bonds to first layer 27, and which provides suitable mechanical and chemical corrosion resistance. In the preferred embodiment, the second polymeric layer 29 is selected from the group consisting of nylons, thermoplastic elastomers, fluoropolymers, and mixtures thereof.

The multi-layer tube 22 may further comprise a third polymeric layer 31 interposed between, and bonded to the first and second polymeric layers. It is to be understood that any suitable polymeric layer may be used which suitably bonds to first layer 27 and to the second layer 29 and which may optionally provide suitable cushioning, if desired. In the preferred embodiment, the third polymeric layer 31 is selected from the group consisting of ionomers, nylons, ethylene vinyl alcohol, polyolefins, and mixtures thereof.

It is to be understood that any or all of the three layers, 27, 29, 31 may include multiple sublayers (not shown). Further, it is to be understood that each of the layers and/or sublayers may be formed from a single compound listed in the relevant group, or from a combination thereof. Still further, it is to be understood that each of the layers/sublayers may be comprised of the same material. The thickness of the combined polymer layers can be as little as 0.004 inch, and can be made even thinner. Successful coatings have been applied having combined polymer layer thicknesses of 0.004 inch, 0.005 inch, 0.006 inch, 0.007 inch, 0.009 inch and 0.010 inch, with a preferred range of 0.005 inch to 0.010 inch.

In lieu of coextrusion, the process could also be carried out as a cross-head application wherein the polymeric layers are applied synchronously instead of simultaneously. However, this process is not as preferred as the coextrusion, in that there is a greater likelihood of loss of bonding efficiency and bonding properties, and there tends to be less control over layer thicknesses.

The polymeric layers may also be applied by any or all of the following exemplary, non-limitative methods: extrusion, flow coating, electrostatic spray painting, electrostatic powder coating, or shrink fitting.

One of the advantages of the present invention is that a chemical or mechanical bond is formed between all the layers. It is believed that good bonding prevents moisture buildup beneath the layers, which buildup greatly increases the likelihood of corrosion.

An example of a tube 22 which can be subjected to the end removal process of the present invention may be prepared as follows. A 3/16 inch brazed steel tube had a GALFAN coating of 78 g/m$^2$ and a phosphate coating of 120–250 mg/ft$^2$, with an additional chromate wash, with the chromate wash having essentially no remaining weight. A primer commercially available from Akzo Nobel under the tradename Nylon Primer 2BME45451 was applied to the tube having the GALFAN/phosphate/chromate as described immediately above. The primer was applied by the airless spray system as described further hereinabove. Applied thereto were two layers of Nylon 12 (VESTAMID X7377) having a total thickness between about 0.005 inch to 0.010 inch.

Further advantages of the present invention stem from the fact that polymers such as nylon stick to themselves—this has been unexpectedly and fortuitously utilized to help to account for variation in OD in tube diameter and radial runout. As such, infinite adjustments and measurements are not necessary to account for such radial runout and OD variations.

The present invention 10 advantageously provides a fast, efficient mechanical means to remove end coating from, eg. nylon coated metal tube, without damaging coating(s) applied to the metal tube substrate. Thus, the present invention is a cost-effective, quick and novel improvement over existing technology which heretofore allowed removal either by non-mechanical heat-based methods, or mechanical processes that may damage tubing substrate coating and/or the tubing substrate itself.

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A method for preparing a multi-layer metal tube, comprising the steps of:
    rotating at least one stripper roll about an axis of rotation to be in engagement with the multi-layer metal tube for breaking the adhesion between at least a portion of a polymeric layer and an outer surface circumference of a metal tube having a corrosion resistant layer applied thereto to cause the polymeric layer portion to retract until only loosely adhered to a non-retracted polymeric layer portion adjacent the retracted portion of the polymeric layer; and
    rotating at least one removal roll about a common axis with the axis of rotation of the corresponding stripper roll for mechanically removing the retracted portion of the polymeric layer while leaving the corrosion resistant layer intact.

2. The method of claim 1, wherein the metal tube has an end, and wherein the polymeric layer portion has a first area adjacent the tube end and a second area distal from the tube end.

3. The method of claim 2, wherein the breaking step is accomplished by at least one cutting edge disposed on the stripper roll, the cutting edge contacting the polymeric layer portion first area to move the first area toward the second area as the tube moves longitudinally relative to the stripper roll cutting edge.

4. The method of claim 3, wherein the mechanical removal step is accomplished by at least two removal rolls.

5. The method of claim 1, wherein the polymeric layer comprises at least one layer, the at least one layer having a predetermined thickness.

6. The method of claim 1, wherein the removed polymeric portion has a length ranging between about 1 mm (0.04") and about 76.2 mm (3").

7. The method of claim 1, wherein the multi-layer metal tube has a diameter ranging between about 3/16" and about 3/8".

8. The method of claim 7, wherein removal of the at least a portion of the polymeric layer occurs within a single pass and has a cycle time ranging between about 2 seconds and about 4 seconds.

9. The method of claim 1, wherein the multi-layer metal tube is a high pressure fluid conduit having two ends, the polymeric layer portion is removed from each end, and wherein the method further comprises the step of:
endforming each of the conduit two ends into one of an SAE-type double and inverted flare, wherein each of the flares is formed where the polymeric layer portion is removed.

10. The method of claim 1, wherein the multi-layer metal tube is a high pressure fluid conduit having two ends, the polymeric layer portion is removed from each end, and wherein the method further comprises the step of:
endforming each of the conduit ends into an ISO-type annularly protruding flare, wherein each of the flares is formed where the polymeric layer portion is removed.

11. The method of claim 1, wherein the multi-layer tube is at least one of a brakeline, a vacuum line, a transmission oil cooler line, a fuel line, and a vapor return line.

12. The method of claim 1, wherein the corrosion resistant layer comprises a zinc layer bonded to the metal tube outer surface, wherein the zinc layer is selected from the group consisting of zinc plating, zinc nickel alloys, zinc cobalt alloys, zinc aluminum alloys, and mixtures thereof.

13. The method of claim 12, wherein the multi-layer tube further comprises a surface treatment layer bonded to the zinc layer, wherein the surface treatment layer is selected from the group consisting of a zinc/aluminum/rare earth alloy, phosphate, chromate, and mixtures thereof.

14. The method of claim 13, wherein the multi-layer tube further comprises:
a first polymeric layer bonded to the surface treatment layer, wherein the first polymeric layer is selected from the group consisting of thermoplastic elastomers, ionomers, nylons, fluoropolymers, and mixtures thereof; and
a second polymeric layer bonded to the first polymeric layer, wherein the second polymeric layer is selected from the group consisting of thermoplastic elastomers, nylons, fluoropolymers, and mixtures thereof.

15. The method of claim 14 further comprising a third polymeric layer interposed between, and bonded to the first and second polymeric layers, wherein the third layer is selected from a group consisting of ionomers, nylons, ethylene vinyl alcohol, polyolefins, and mixtures thereof.

16. The method of claim 15 further comprising at least one polymeric sublayer.

17. The method of claim 14, wherein the first polymeric layer is nylon 12 and the second polymeric layer is nylon 12.

18. The method of claim 14, wherein the polymeric layers are applied by at least one of coextrusion, synchronous cross-head application, extrusion, flow coating, electrostatic spray painting, electrostatic powder coating, and shrink fitting.

19. A method for preparing a multi-layer metal tube, comprising the steps of:
rotating at least one stripper roll about an axis of rotation to be in engagement with the multi-layer metal tube for breaking the adhesion between at least a portion of a polymeric layer and an outer surface circumference of a metal tube to cause the polymeric layer portion to retract until only loosely adhered to a non-retracted polymeric layer portion adjacent the retracted portion of the polymeric layer; and
rotating at least one removal roll about a common axis with the axis of rotation of the corresponding stripper roll for mechanically removing the retracted portion of the polymeric layer while leaving the metal tube outer surface undamaged.

20. A method for preparing a multi-layer metal tube comprising the steps of:
rotating at least one stripper roll about an axis of rotation parallel to and offset from a longitudinal axis of the metal tube being processed, the stripper roll in engagement with the multi-layer metal tube for breaking the adhesion between at least a portion of a polymeric layer and an outer surface circumference of a metal tube to cause the polymeric layer portion to retract until only loosely adhered to a non-retracted polymeric layer portion adjacent the retracted portion of the polymeric layer; and
rotating at least one removal roll about an axis of rotation parallel to and offset from the longitudinal axis of the metal tube being processed for mechanically removing the retracted portion of the polymeric layer.

21. The method of claim 20, wherein the multi-layer metal tube is a high pressure fluid conduit having two ends, the polymeric layer portion is removed from at least one end, and wherein the method further comprises the step of:
endforming at least one end of the conduit into one of an SAE-type double and inverted flare, wherein the flare is formed where the polymeric layer portion has been removed.

22. The method of claim 20, wherein the multi-layer metal tube is a high pressure fluid conduit having two ends, the polymeric layer portion is removed from at least one end, and wherein the method further comprises the step of:
endforming at least one end of the conduit into an ISO-type annularly protruding flare, wherein the flare is formed where the polymeric layer portion has been removed.

23. The method of claim 20 further comprising the step of:
supporting the axes of rotation for the stripper roll and the removal roll with a rotatable housing, wherein the rotating steps occur in response to the housing being rotated.

24. The method of claim 20 further comprising the step of:
rotating at least one guide roll on an axis of rotation parallel to and offset from the longitudinal axis of the metal tube being processed, the guide roll, the corresponding stripper roll, and the corresponding removal roll having a common axis of rotation, and the removal roll positioned interposed between the guide roll and the stripper roll.

* * * * *